United States Patent [19]

Blacklaw

[11] Patent Number: 4,721,324

[45] Date of Patent: Jan. 26, 1988

[54] LOCKING MECHANISM FOR TRAILER COUPLING

[76] Inventor: William Blacklaw, 4434 SE. 25th, Portland, Oreg. 97202

[21] Appl. No.: 16,565

[22] Filed: Feb. 19, 1987

[51] Int. Cl.⁴ .............................................. B60D 1/06
[52] U.S. Cl. .................................... 280/504; 280/507
[58] Field of Search ....................... 280/504, 507, 515

[56] References Cited

U.S. PATENT DOCUMENTS

| 2,766,995 | 10/1956 | Weiss | 280/504 |
| 2,842,380 | 7/1958 | Weiss | 280/504 |
| 3,475,037 | 10/1969 | Weiss | 280/504 |
| 3,963,266 | 6/1976 | Thelin | 280/504 |

OTHER PUBLICATIONS

Brochure of Eagle Manufacturing Company on No. 620 Hitch Catalog of Eagle Manufacturing Company on Model 620 Coupling.

*Primary Examiner*—John J. Love
*Assistant Examiner*—Donn McGiehan
*Attorney, Agent, or Firm*—Chernoff, Vilhauer, McClung & Stenzel

[57] ABSTRACT

The locking mechanism of the present invention is comprised of a pawl which is rotatable to a locking position, where it contacts the latch which covers the pintle that carries the trailer drawbar. The pawl has a central cavity which contains a pair of rotatably mounted prongs that normally extend outwardly from the sides of the pawl but which can be placed into the cavity when manually deflected. When the pawl is in its locking position, against the latch, the prongs extend into notches in the side walls of the body of the coupling and thereby prevent the pawl from being lifted off of the latch. A cam, which is rotatably mounted on the bolt which journals the pawl, has paired plates which fit behind the prongs and prevent them from being deflected into the cavity. Thus, before the prongs can be deflected and thereafter the pawl lifted to unlock the latch, the cam must be rotated to a position where its faces are moved away from the prongs.

4 Claims, 5 Drawing Figures

LOCKING MECHANISM FOR TRAILER COUPLING

BACKGROUND AND SUMMARY OF THE INVENTION

This invention relates to a trailer coupling and in particular to a latch which prevents a trailer coupling from becoming opened inadvertently.

Trailer couplings of the type which have a vertical pintle that receive the annular eye of a trailer drawbar generally have a multiple-stage locking mechanism which prevents the latch from becoming lifted in use and thus permit the drawbar to accidentally lift off of the pintle. Until recently devices of this type were at best double locking; that is two independent motions had to be made in order to release the latch mechanism so that it could be lifted off of the pintle. Typical of double locking couplings are Weiss, U.S. Pat. No. 3,475,037, Weiss, U.S. Pat. No. 2,842,380 and Weiss, U.S. Pat. No. 2,766,995. Recently triple locking latches have become known which provide a greater degree of safety against accidental release of the drawbar than is obtained with double locking latches. Couplings having triple locking latches are manufactured and sold by Eagle Manufacturing Company of Portland, Oreg. and are designated as the 600 Series.

The primary advantage of the Weiss '037 coupling over the earlier Weiss '380 coupling is that the latter coupling requires lateral sliding movement of one of the locking elements to unlock it, whereas the former coupling utilizes rotary movement to unlock all of its locking components. While sliding generally works well, when the locking mechanism is not activated for a period of time rust can accumulate and cause a sliding element to bind. Even though the Eagle 600 Series couplings provide the superior safety of triple locking, they utilize sliding as the method of releasing one of their locking elements and thus are susceptible to becomming jammed due to rust. In addition, the three locking mechanisms in the Eagle 600 Series couplings are not totally independent, and the failure of certain elements in one of the locking mechanisms will make another of the locking elements inoperative.

The present invention provides a triple locking trailer coupling which overcomes the shortcomings of the prior art triple locking couplings by providing entirely rotary locking elements. The latch which contacts the extremity of the pintle that carries the trailer drawbar is locked in place by means of a rotatable pawl which must be lifted off of the latch before the latch can be raised. The pawl rotates on a shorter radius than the latch does and when in contact with the latch it interferes with a raised block on the latch to prevent an attempt to rotate the two elements together. Thus, the latch cannot be rotated away from the pintle without first lifting the pawl away from it.

Located medially in the rear of the pawl is a cavity which has a pair of elongate, rectangularly cross-sectioned prongs rotatably mounted in it. The prongs are positioned so that their forwardmost ends are always located inside of the cavity and they can be rotated so that the remainder of their extent either is located entirely in the cavity or else projects from it. A spring located between the prongs urges them toward the position where they extend out of the cavity.

The walls of the hitch body have notches in them which permit the prongs to protrude out of the cavity in the pawl when the pawl is in its locked position on top of the latch. The notches are localized and thus contact the tops of the prongs so as to prevent the pawl from being raised. As a result it is necessary to deflect the prongs against the spring before the pawl can be lifted off of the latch.

A cam, which is mounted rotatably on the bolt which journals the pawl, has paired plates which fit behind the rearward ends of the prongs. The plates are arranged so that when the cam is rotated to a locked position they lie behind the prongs and prevent them from being deflected into the cavity, and when the cam is rotated to an unlocked position they are positioned away from the prongs. A spring simultaneously urges the cam to its locked position and the pawl down against the latch.

Accordingly, in order to raise the latch it is necessary to first rotate the cam against the spring to its unlocked position. Then, while the cam is being held in its unlocked position, it is necessary to deflect the prongs into the cavity in the pawl. Finally, while the prongs are still being deflected, it is necessary to lift the pawl away from the latch.

Not only are three independent rotary steps required to unlock the latch, incapacitation of either of the elements which provide the first two steps will not disenable the locking mechanism but the remaining lock elements will remain in effect and must be released in order to lift the latch.

Accordingly, it is principal object of the present invention to provide a locking mechanism for trailer couplings which requires three independent locks to be opened in order for the latch to be made openable.

It is a further object of the present invention to provide such a locking mechanism where all three locks are activated by rotary movement.

If is a further object of the present invention to provide such a locking mechanism where faillure of either of the first two locks does not prevent the remaining two from operating.

The foregoing and other objectives, features and advantages of the present invention will be more readily understood upon consideration of the following detailed description of the invention taken in conjunction with the accompanying drawings.

PREFERRED EMBODIMENT OF THE INVENTION

Figure 1:
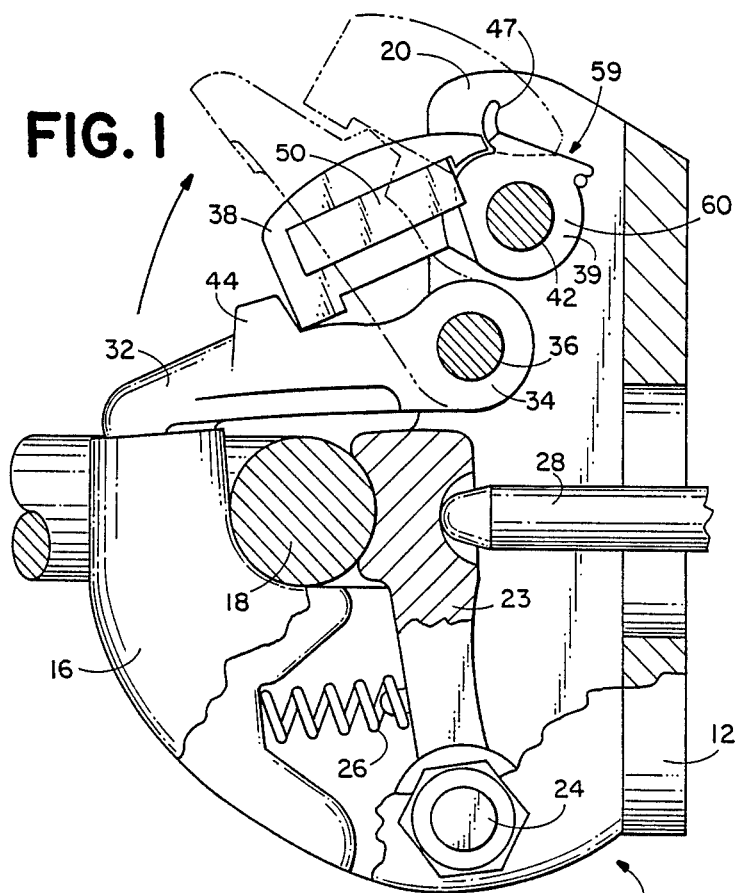
FIG. 1 is a side elevational view, partially broken away, of a trailer coupling embodying the features of the present invention, with the latch and pawl mechanism shown in their raised positions in dashed line.
Figure 2:
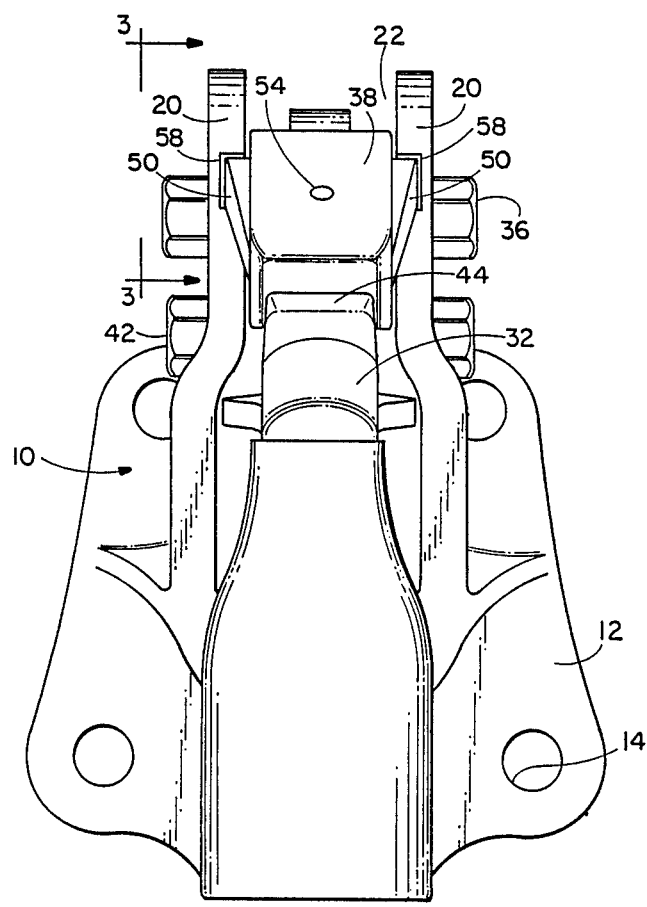
FIG. 2 is a plan view of the trailer coupling of FIG. 1.

Referring to FIGS. 1 and 2 of the drawings, the locking mechanism of the present invention is used on a trailer hitch of the type having a body 10 with a flat base 12 which has bolt holes 14 at its corners to permit attachment to a towing vehicle (not shown). The lower portion of the body comprises a J-shaped pintle 16 which extends forwardly and upwardly from the base 12. The upwardly extending extremity of the pintle is cylindrical and is sized to snugly receive the annular eye 18 located at the end of the drawbar which is attached to it. Located forwardly of the base 12, in the upper portion of the body, are spaced apart side walls 20 which form a cavity 22 for receiving the coupling latch assembly. Located in the bottom portion of the cavity is a friction shoe 23 which is pivotally mounted on a bolt 24, so that it can be urged into contact with the drawbar 18 after the drawbar is placed on the pintle. A spring 26 normally urges the friction shoe away from the drawbar in order to facilitate its installation, and a ram 28, which is coupled to a hydraulic cylinder (not shown), urges the friction shoe into contact with the drawbar when it is installed on the pintle.

Located in the upper portion of the cavity 22 is a latch 32 having a boss 34 located at one end which fits between the side walls 20. A bolt 36 extending through mating holes in the side walls and the boss allows the latch to rotate between a closed position (solid line in FIG. 1), where the extremity of the latch engage the extremity of the pintle to prevent the drawbar from becoming dislodged, and an open position (dashed line in FIG. 1).

Figure 5:
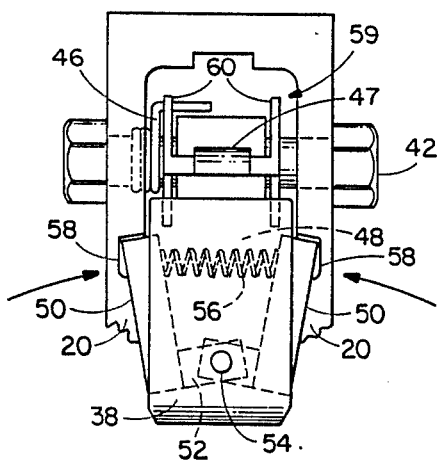
FIG. 5 is an elevation view taken along the line 5—5 of FIG. 4.

Located above the latch is a pawl 38 which also has a boss 39 located at one end which fits between the side walls 20. A bolt 42, extends through mating holes in the side walls and boss to allow the pawl to rotate. When the pawl is rotated to a locking position, shown in solid line in FIG. 1, its extremity engages a raised block 44 which is located on top of the latch 32. Thus, the pawl prevents the latch from being raised and locks it in its closed position, and in order to open the latch the pawl must first be lifted out of contact with it. A torsion spring 46, FIG. 5, which fits around the bolt 42 urges the pawl downwardly into contact with the latch.

Figure 3:
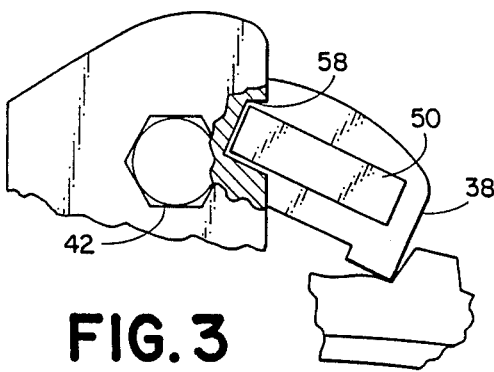
FIG. 3 is a side elevational view taken along the line 3—3 on FIG. 2.

Located medially in the rear portion of the pawl 38 is a cavity 48 which contains two elongate rectangularly cross-sectioned prongs 50. Tabs 52 located at the front of the prongs are rotatably mounted on a pin 54 carried by the pawl and are sized such that the outer front corners of the prongs are flush with the sides of the pawl. Since the prongs are rotatable about the pin 54 their rear portions can either be enclosed in the cavity 48 or protrude out of it. A spring 56, which fits between the prongs, rotates them outwardly so that they normally extend out of the pawl. Notches 58 are formed in the side walls, FIG. 3, to permit the prongs 50 to extend out of the pawl when the pawl is in its locking position against the latch. However, the notches are arranged so that the top surfaces of the portions of the prongs which protrude from the pawl will be engaged by the side walls if the pawl is raised. Thus, the pawl cannot be raised unless the prongs are deflected against the spring 56 into the cavity.

Figure 4:
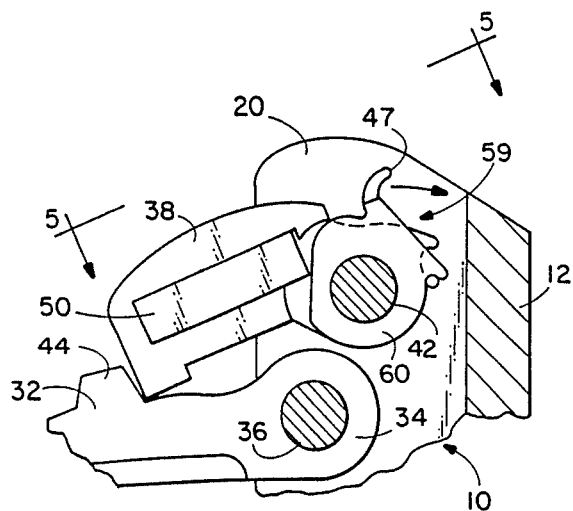
FIG. 4 is a fragmentary side elevation view, partially broken away, showing the details of the pawl assembly.

Rotatably mounted on the bolt 42, which carries the pawl, is a cam 59 which acts as a lock to prevent deflection of the prongs 50 into the cavity unless it first is unlocked. The cam includes two flat plates 60, one of which is located immediately inwardly of the inside, rearward corner of each prong 50 when the prongs are in their normal extended positions. The plates are shaped such that when the cam is rotated to a locked position, FIG. 1, they lie behind the prongs 50 and prevent the prongs from being deflected inwardly into the cavities. However, when the cam is rotated to an unlocked position, FIG. 4, the plates do not lie behind the prongs and the prongs can be deflected into the cavity. The spring 46, which urges the pawl to its locking position, also urges the cam to its locked position, and a raised finger grip 47 on the top edge of the cam facilitates rotating it against the pressure of the spring to its unlocked position.

In operation the locking mechanism of the present invention provides a lock which prevents the latch from inadvertently being raised even if one of its components should fail. If the spring 56 were to fail, the cam would still prevent the prongs from being deflected inwardly into the cavity 48. Likewise, if the spring 46 were to fail, thus permitting inadvertent unlocking of the cam, the spring 56 would keep the prongs in their extended position. It is only by first lifting the cam 59, against the spring 46 and then, while the cam is still being lifted, deflecting the prongs 50 against the spring 56 that the pawl can be lifted off of the latch, which must occur before the latch can be raised. Thus the hitch has a triple lock wherein all three components must be deactivated before the latch can be moved.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A locking mechanism for a trailer coupling of the type having a body which is attached to a towing vehicle, a drawbar receiving pintle, a latch which engages the extremity of the pintle to prevent removal of the drawbar therefrom, and a pawl which is rotatable between a locking position where it is in interlocking engagement with the latch and an unlocking position above the latch, said locking mechanism comprising:
   (a) catch means associated with the pawl for engaging the body when said pawl is in its locking position for preventing the rotation of said pawl from said locking position;
   (b) means for disengaging said catch means from said body;
   (c) lock means for preventing unintentional disengagement of said catch means from said body;
wherein said pawl has a cavity defined medially therein and said catch means includes;
   (i) a pair of elongate prongs;
   (ii) said prongs each having one end which is located within said cavity and is rotatably joined to said pawl;
   (iii) said prongs being oriented such that they are rotatable between a first position where the other ends thereof protrude out of said cavity and a second position where said other ends are enclosed within said cavity; and
   (iv) biasing means for normally placing said prongs in said second position.

2. The locking mechanism of claim 1 wherein said pawl is rotatably journaled on a pin which is mounted on said body and said lock means comprises:
   (a) a cam which is rotatably mounted on said pin;
   (b) said cam having plates which prevent said prongs from being rotated from said first position when said cam is rotated on said pin to a locked position; and (c) said plates being shaped such that when said cam is rotated on said pin to an unlocked position they do not prevent said prongs from being rotated from said first position.

3. The locking mechanism of claim 1 including a torsion spring which is located on said pin and urges said cam to its locked position.

4. The locking mechanism of claim 3 wherein said spring also urges said pawl toward its first position.

* * * * *